United States Patent
Wisniewski et al.

(10) Patent No.: US 11,545,802 B2
(45) Date of Patent: Jan. 3, 2023

(54) FORK STRUCTURE FOR POSITIVE RETENTION AND CENTERING A WIRE FOR ELECTRICAL CONNECTION

(71) Applicant: Vitesco Technologies USA, LLC, Auburn Hills, MI (US)

(72) Inventors: Andrew Wisniewski, South Lyon, MI (US); Laura Noel Church, Grosse Ile, MI (US)

(73) Assignee: VITESCO TECHNOLOGIES USA, INC., Auburn Hills, MI (US)

(*) Notice: Subject to any disclaimer, the term of this patent is extended or adjusted under 35 U.S.C. 154(b) by 329 days.

(21) Appl. No.: 16/744,273

(22) Filed: Jan. 16, 2020

(65) Prior Publication Data
US 2021/0226397 A1   Jul. 22, 2021

(51) Int. Cl.
| | |
|---|---|
| H01G 2/00 | (2006.01) |
| H01G 13/00 | (2013.01) |
| H01R 4/18 | (2006.01) |
| H01R 43/048 | (2006.01) |

(52) U.S. Cl.
CPC ............. *H01R 43/048* (2013.01); *H01G 2/00* (2013.01); *H01G 13/006* (2013.01); *H01R 4/184* (2013.01)

(58) Field of Classification Search
CPC ........ H01G 2/00; H01G 13/006; H01G 13/00; H01R 4/184; H01R 4/187; H01R 4/18; H01R 43/048; H01R 13/40
USPC ..................................... 361/306.1; 439/733.1
See application file for complete search history.

(56) References Cited

U.S. PATENT DOCUMENTS

| | | | | |
|---|---|---|---|---|
| 5,667,131 A | * | 9/1997 | Sugiyama | H01R 43/01 228/5.1 |
| 5,685,733 A | * | 11/1997 | Janczak | H01R 4/2425 439/395 |
| 5,999,400 A | * | 12/1999 | Belopolsky | H01R 24/64 174/64 |
| 6,431,903 B1 | * | 8/2002 | Dittmann | H01R 4/242 439/395 |
| 9,172,152 B2 | | 10/2015 | Matoba et al. | |
| 9,570,818 B2 | | 2/2017 | Som | |
| 2004/0004059 A1 | | 1/2004 | Oishi | |
| 2010/0267252 A1 | * | 10/2010 | Fujimoto | H01G 9/10 439/825 |

(Continued)

FOREIGN PATENT DOCUMENTS

| | | | | |
|---|---|---|---|---|
| DE | 7021001 U | * | 11/1970 | |
| DE | 19746763 A1 | * | 5/1999 | F02M 69/54 |

*Primary Examiner* — Timothy J Thompson
*Assistant Examiner* — Guillermo J Egoavil

(57) ABSTRACT

An electronic device includes a fork structure having a pair of arms disposed in spaced relation and defining an open-ended channel therebetween. A surface of channel defines a seat opposite the open end. The channel has a width $W_1$ at its narrowest section. A rigid wire of an electrical component is disposed in the channel generally adjacent to the seat. The wire has a width $W_2$ that is greater than the width $W_1$ so surfaces of the channel at the narrowest section defined by width $W_1$ interfere with the wire, preventing the wire from moving towards the open end of the channel. The pair of arms are constructed and arranged to be moved toward each other so as to crimp the wire to the fork structure.

11 Claims, 4 Drawing Sheets

(56) References Cited

U.S. PATENT DOCUMENTS

| | | | |
|---|---|---|---|
| 2011/0041295 A1* | 2/2011 | Reiter | A44B 17/0064 24/595.1 |
| 2011/0076898 A1* | 3/2011 | Taniguchi | H01R 4/2425 439/733.1 |
| 2017/0179460 A1 | 6/2017 | Gotoh | |
| 2019/0296500 A1* | 9/2019 | Morello | H01R 24/60 |

* cited by examiner

FORK STRUCTURE FOR POSITIVE RETENTION AND CENTERING A WIRE FOR ELECTRICAL CONNECTION

FIELD

The invention relates to automotive electronics where conductive wires are mechanically and electrically joined to mating conductors and, more particularly, to a fork structure that positively retains and centers a wire for electrical connection.

BACKGROUND

With reference to FIG. 1, a portion of an electric component, such as a capacitor 10, is shown having a rigid wire 12. An end 14 of the wire 12 is shown crimped and welded to a conventional fork structure 16 to make a mechanical and electrical connection therewith. As shown in FIG. 2, prior to crimping, the fork structure 16 has a U-shaped distal end 18 having a constant width channel 20 that receives the end 14 of the wire. FIG. 3 shows the wire end 14 crimped and welded to the fork structure 16. With such a U-shaped channel 20, it is difficult to assembly the wire end 14 to the fork structure 16 in a drop-down orientation, since there is no positive retention for the wire end 14. Thus, the wire end 14 can ride-up the channel 20 during crimping and thus can become over-compressed or damaged. Also, the fork structure 16 can be damaged. Note that as shown in FIG. 3, the wire 12 cross-section is deformed from circular (FIG. 2) to oval shape due to being over-compressed by the fork structure 16.

Thus, there is a need to provide a fork structure for an electrical and mechanical connection that positively retains and centers a wire during crimping and welding to avoid over-compressing the wire.

SUMMARY

An objective of the invention is to fulfill the need referred to above. In accordance with the principles of a present embodiment, this objective is achieved by an electronic device that includes a fork structure having a pair of arms disposed in spaced relation and defining an open-ended channel therebetween. A surface of channel defines a seat opposite the open end. The channel has a width $W_1$ at its narrowest section. A rigid wire of an electrical component is disposed in the channel generally adjacent to the seat. The wire has a width $W_2$ that is greater than the width $W_1$ so surfaces of the channel at the narrowest section defined by width $W_1$ interfere with the wire, preventing the wire from moving towards the open end of the channel. A portion of the channel that is adjacent to the seat is configured to correspond in shape with a cross-sectional shape of the wire. The pair of arms are constructed and arranged to be moved toward each other so as to crimp the wire to the fork structure with no or limited deformation of the wire.

In accordance with another aspect of an embodiment, a fork structure is provided for coupling with a rigid wire of an electronic component. The fork structure includes a pair of arms disposed in spaced relation and defining an open-ended channel therebetween, a surface of channel defining a seat opposite the open end, the channel having a width $W_1$ at its narrowest section, the channel having a portion adjacent to the seat having a width $W_3$ at its largest section that is greater than width $W_1$, and greater than a width of any other portion of the channel, In accordance with yet another aspect of an embodiment a method of mechanically and electrically connecting a wire of an electrical component to a fork structure is provided. The method provides a fork structure having a distal end defined by pair of arms disposed in spaced relation defining an open-ended channel therebetween. A surface of channel defines a seat opposite the open end. The channel has a width $W_1$ at its narrowest section. The electrical component has a rigid wire extending therefrom. The wire has a width $W_2$ that is greater than the width $W_1$. The channel has a portion adjacent to the seat that corresponds in shape with a cross-sectional shape of the wire. An end of the wire is moved into the open end of the channel past the narrowest section thereof and into the portion so that the wire is generally adjacent to the seat. The arms are moved towards each other to close the open end of the channel and thus crimp the wire to the fork structure while surfaces of the channel at the narrowest section thereof interfere with the wire to prevent the wire from moving towards the distal end the channel, and with the portion of the channel limiting deformation of the wire during crimping. The tips of the arms are then welded together to thereby electrically and mechanically connect the wire to the fork structure.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 3:
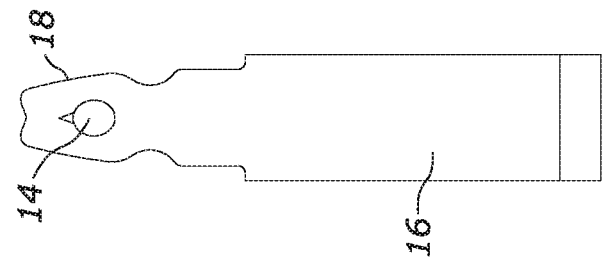
FIG. 3 is a front view of the conventional fork structure of FIG. 2, shown after crimping and welding the wire thereto.
Figure 2:
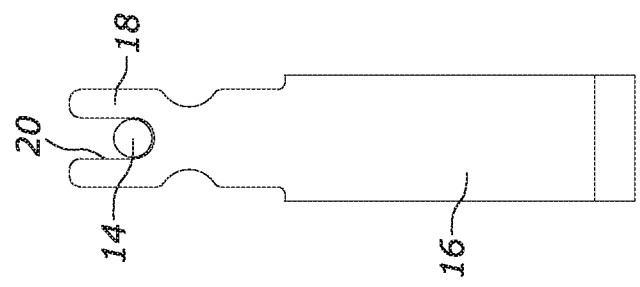
FIG. 2 is a front view of the conventional fork structure of FIG. 1 having a U-shaped channel for receiving the wire, shown prior to crimping and with the capacitor not shown.
Figure 1:
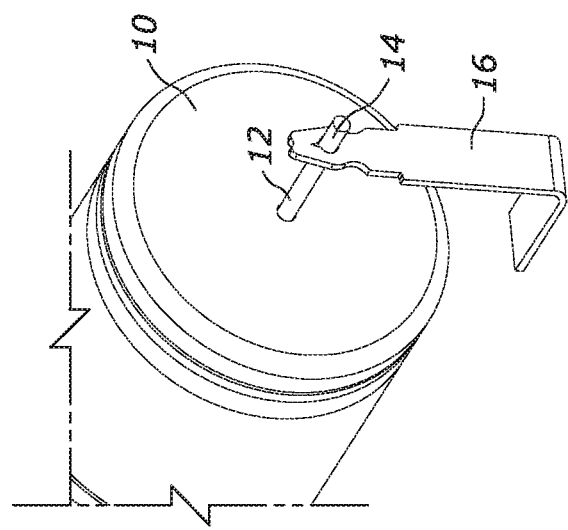
FIG. 1, is a perspective view of a portion of a capacitor having a rigid wire crimped and welded to a conventional fork structure to make a mechanical and electrical connection therewith.
Figure 5:
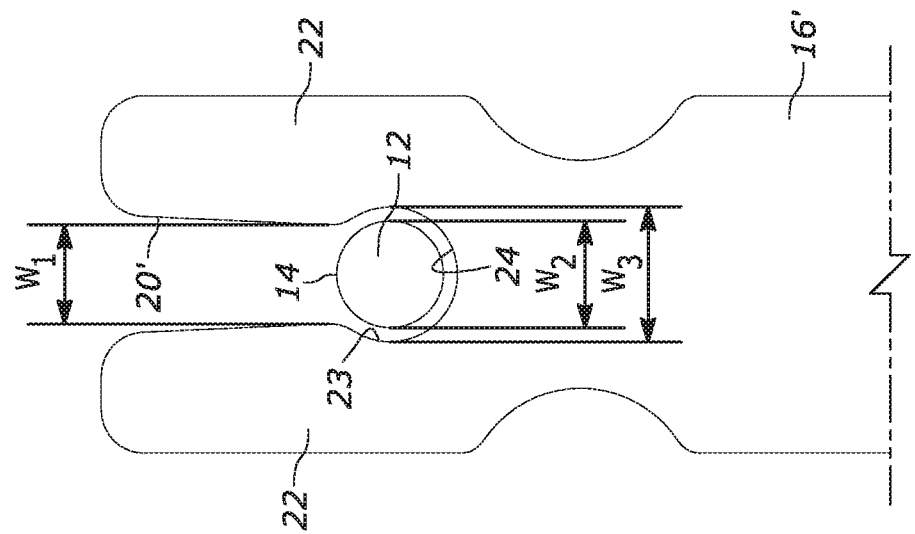
FIG. 5 is an enlarged view of the distal end of the fork structure of FIG. 4.
Figure 4:
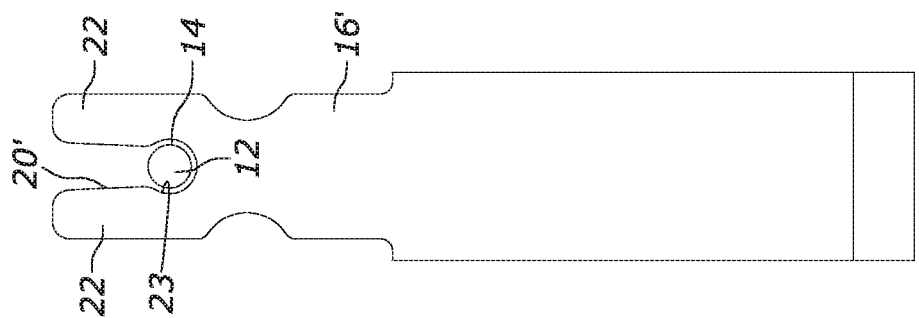
FIG. 4 is a front view of a fork structure of an embodiment having a channel with portions having varying widths for receiving a wire, shown prior to crimping and with the capacitor not shown.

With reference to FIG. 4, a front view of an electrically conductive fork structure 16' of an embodiment of the invention shown in an uncrimped condition. The fork structure 16' has a pair of spaced arms 22 defining an open-ended channel 20' therebetween. A surface of the channel 20' opposite the open end defines a seat 24, upon which the distal end 14 of the rigid pin or wire 12 may rest when disposed in the channel 20'. As best shown in FIG. 5, in the embodiment, the channel 20' has a width $W_1$ at its narrowest section and a bottom portion 23 of the channel 20' has a width $W_3$ at its largest section that is greater than width $W_1$ and greater than a width of any other portion of the channel 20'. The width $W_3$ of the portion 23 is sized to loosely receive the wire 12 having a width $W_2$. Thus, the portion 23 of the channel 20' is adjacent to the seat 24 and is configured to correspond in shape with the cross-sectional shape of the wire 12, the function of which will be explained below In accordance with the embodiment, the width $W_2$ of the wire 12 is larger than the width $W_1$ at the narrowest section of the channel 20'. For example, $W_2$ can be 1.0 mm and $W_1$ can be 0.95 mm. By introducing a small interference fit between the channel 20' and the wire 12, during assembly, the wire 12 can be slid past the restriction at $W_1$ to effectively hold on the centerline without the need for additional mechanical fixturing during the next phase of assembly as explained more fully below.

Figure 6A:
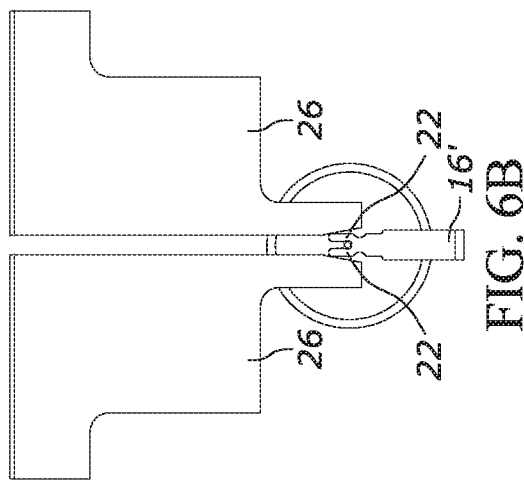
FIGS. 6A-6D show the steps of crimping and welding a wire of an electronic component to the fork structure in accordance with an embodiment.
Figure 6B:
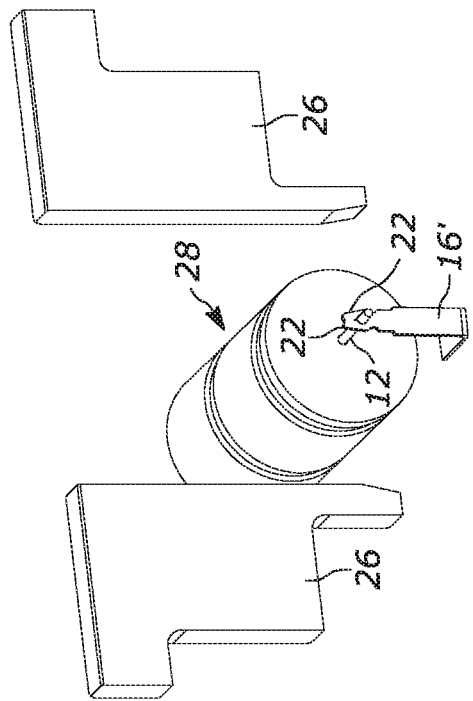
Figure 6C:
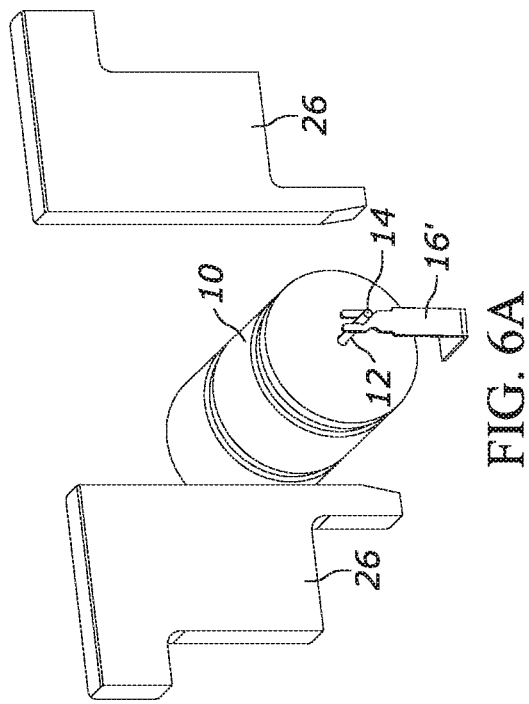
Figure 6D:
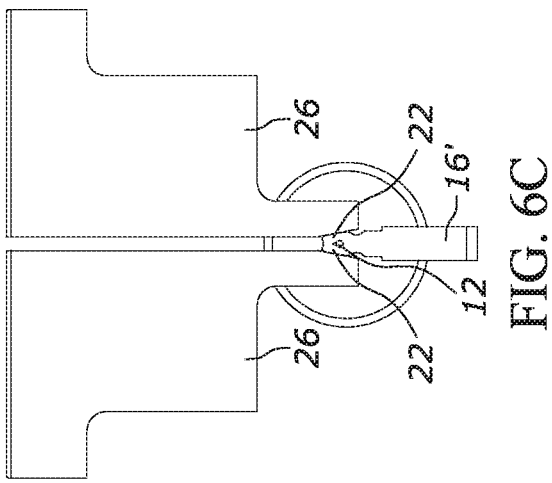
Figure 7:
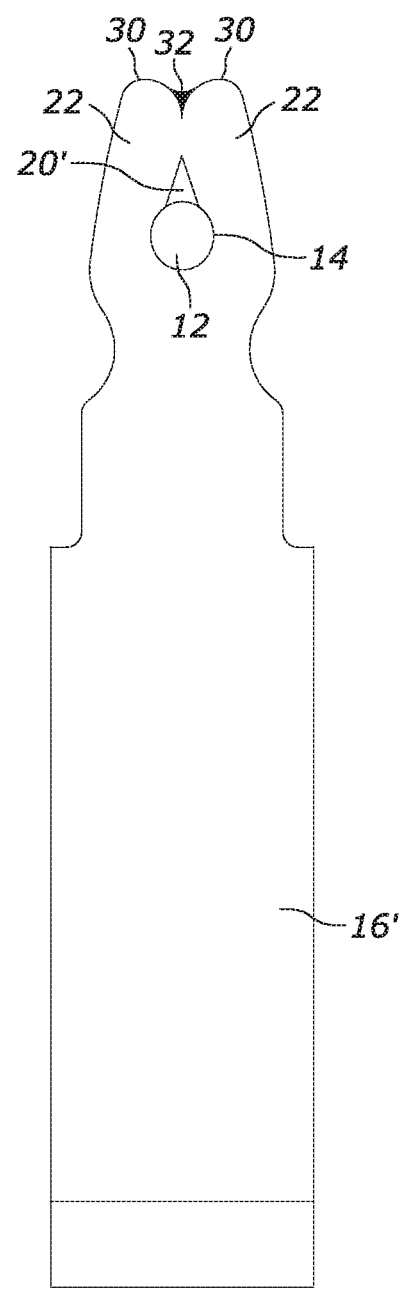
FIG. 7 is a front view of the fork structure of FIG. 4, shown after crimping and welding the wire thereto.

With reference to FIGS. 6A-6D, the assembly of the wire 12 to the fork structure 16' is shown in accordance with an embodiment. In FIG. 6A, the wire 12 of an electrical component such as a capacitor 10 is dropped down from above into the open end of the channel 20' and the distal end 14 of the wire 12 is moved past the narrowest section ($W_1$) of the channel 20' and into the portion 23 to rest on or be adjacent to the seat 24. In FIG. 6B, crimping jaws 26 are moved inwardly to engage the arms 22 of the fork structure 16'. In FIG. 6C, the jaws 26 are moved further inwardly against the arms 22 to close the opened end of the channel 20' and thus crimp the wire 12 to the fork structure 16' while the wire remains fixed near the seat 24. In FIG. 6D, the jaws 26 are opened and, thereafter, the tips of the arms 22 of the fork structure 16' can be welded together to further electrically and mechanically connect the wire 12 to the fork structure 16' defining an assembled electronic device generally indicated at 28. FIG. 7 shows the wire 12 crimped by the arms 22, with the tips 30 of the arms being joined by a weld 32 so that the wire 12 is electrically and mechanically connected to the fork structure 16'. Note that due to the portion 23 of the channel 20', after crimping, the cross-section of the wire 12 remains circular since it is not over-compressed by the fork structure 16'. Once the wire 12 is electrically and mechanically connected to the fork structure 16', the fork structure 16' can be electrically connected to a circuit (not shown).

Thus, during the above assembly procedure, since the wire 12 is prevented from moving upwardly in the channel 20' due to interference with surfaces of the narrowest section thereof defined by width $W_1$, and due to the shape of the portion 23 of the channel 20', the fork structure 16' advantageously prevents or limits over compressing or causing deformation of the wire 12 during the crimping and welding processes.

In the embodiment, the wire 12 has a circular cross-section and thus $W_2$ is the diameter of the wire 12 and the portion 23 is configured to receive the round wire so as to correspond with more than 180 degrees thereof. However, it is within the scope of the embodiment to provide the wire 12 having other cross-sectional shapes such as, for example, oval, rectangular, square, etc. with the portion 23 being configured to receive such shaped wires.

Although a capacitor 10 is shown as the electrical component having the wire 12 extending therefrom, it can be appreciated that any electrical component that requires a wire to be electrically and mechanically connected to a fork structure can be employed.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An electronic device comprising:
a fork structure comprising a pair of arms disposed in spaced relation and defining an open-ended channel therebetween, a surface of channel defines a seat opposite the open end, the channel having a width W1 at its narrowest section; and
a rigid wire of an electrical component disposed in the channel generally adjacent to the seat, the wire having a width W2 that is greater than the width W1 so surfaces of the channel at the narrowest section defined by width W1 interfere with the wire, preventing the wire from moving towards the open end of the channel;
wherein the pair of arms are constructed and arranged to be moved toward each other so as to crimp the wire to the fork structure, and the cross-section of the wire remains unchanged;
wherein a portion of the channel near the seat has a width W3 at its largest section that is greater than width W1, and greater than a width of any other portion of the channel, and wherein the width W2 is smaller than the width W3;
wherein the portion of the channel is adjacent to the seat and is configured to correspond in shape with a cross-sectional shape of the wire.

2. The electronic device of claim 1, wherein the wire extends from a capacitor defining the electrical component.

3. The electronic device of claim 1, wherein a cross-section of the wire is circular.

4. The electronic device of claim 1, wherein the cross-sectional shape of the wire is circular.

5. A fork structure for coupling with a rigid wire of an electronic component, the fork structure comprising:
a pair of arms disposed in spaced relation and defining an open-ended channel therebetween, a surface of channel defining a seat opposite the open end, the channel having a width W1 at its narrowest section, the channel having a portion adjacent to the seat having a width W3 at its largest section that is greater than width W1 and greater than a width of any other portion of the channel;
wherein the pair of arms are moved towards each other so as to crimp the wire to the fork structure, such that the cross-section of the wire remains unchanged;
wherein, in combination with the wire, the wire having a width W2 that is greater than the width W1 so surfaces of the channel at the narrowest section defined by width W1 interfere with the wire, preventing the wire from moving towards the open end of the channel;
wherein the portion of the channel adjacent to the seat is configured to correspond in shape with a cross-sectional shape of the wire.

6. The fork structure of claim 5, wherein the width W2 is smaller than the width W3.

7. A method of mechanically and electrically connecting a rigid wire of an electrical component to a fork structure, the method comprising the steps of:

provided the fork structure having a distal end defined by pair of arms disposed in spaced relation defining an open-ended channel therebetween, a surface of channel defining a seat opposite the open end, the channel having a width W1 at its narrowest section, providing the electrical component having the rigid wire extending therefrom, the wire having a width W2 that is greater than the width W1, the channel having a portion adjacent to the seat that corresponds in shape with a cross-sectional shape of the wire, moving an end of the wire into the open end of the channel past the narrowest section thereof and into the portion so that the wire is generally adjacent to the seat, and moving the arms towards each other to close the open end of the channel and thus crimp the wire to the fork structure while surfaces of the channel at the narrowest section thereof interfere with the wire to prevent the wire from moving towards the distal end the channel, and with the portion of the channel limiting deformation of the wire during crimping, and the cross-section of the wire remains unchanged after crimping.

8. The method of claim 7, further comprising welding tips of the arms together to thereby electrically and mechanically connect the wire to the fork structure.

9. The method of claim 7, wherein the fork structure is provided such that the portion of the channel adjacent to the seat has a width W3 at its largest section that is greater than width W1 and greater than a width of any other portion of the channel, and wherein the width W2 is smaller than the width W3.

10. The method of claim 7, wherein the wire extends from a capacitor defining the electrical component.

11. The method of claim 7, wherein a cross-section of the wire is circular.

* * * * *